July 18, 1944.  E. HAZELL  2,354,017

METHOD OF MAKING BALL CENTER

Filed Feb. 7, 1939

INVENTOR.
EARDLEY HAZELL
BY Gourley & Budlong
ATTORNEYS

Patented July 18, 1944

2,354,017

UNITED STATES PATENT OFFICE 2,354,017

METHOD OF MAKING BALL CENTERS

Eardley Hazell, North Kingstown, R. I., assignor to United States Rubber Company, New York, N. Y., a corporation of New Jersey Application February 7, 1939, Serial No. 255,056

4 Claims. (Cl. 154—18)

This invention relates to a method of making a ball center, and more particularly a golf ball center.

Practically all modern better grade golf balls are now made with a tense winding of rubber thread around a mobile or liquid center, since this construction has been found to give a maximum of distance and other desirable characteristics. In the making of such centers it is necessary to confine the liquid or mobile filling material within an outer flexible or resilient envelope before the thread winding operation can be initiated. In some cases, balls have been made by utilizing an outer envelope of rubber within which a mobile filling material is located, but due to the mobility of the filler element, the thread winding operation cannot readily be started directly on a winding machine, and instead the winding at beginning of the operation has been manually performed, using a broad rubber tape, and after sufficient windings of this had been placed on the center it became firm enough to start the machine winding. However, this method of winding the center is objectionable because at best it cannot produce a ball with a symmetrically disposed and rounded center, and the earlier windings cannot be put on at the desired tension, so that the finished ball has windings of different tensions at different distances from its center. To obviate this objection the common procedure has been to fill a rubber envelope with a mobile material and then freeze the assembly so that winding of the thread could be directly started by machine on the frozen center. Still another method has been to first freeze in a mold the mobile filling material and then surround it by a rubber envelope.

One method of making the rubber envelopes has been to provide a small thin sac of rubber made by a dipping process from a rubber cement or latex, the sac being provided with a filling neck. After forming and vulcanizing such a sac it is filled with the desired mobile filler, the neck tied off with rubber thread, and the excess portion of the neck cut off. This operation is a messy one, and it produces a center which is irregular by reason of the remaining portion of the neck and the thread tying it off.

Another method has been to form hemispherical molded halves or cups of rubber which are semi-cured or completely cured, and then united as by rubber cement. This envelope is then filled with the desired mobile material by means of a hypodermic needle.

All of these methods have objections by reason of cost, handling of the mobile material, undue amount of hand labor, and other objections. Also, in one of the above methods it has been necessary to use two freezing operations, one before placing the filling material in its envelope and vulcanizing the latter, and a second one before beginning the thread winding operation.

An object of the present invention is to provide an improved method of making golf ball and other play ball centers, and also an improved article.

Another object is to avoid one or both freezing operations.

Another object is to provide a ball center with a filling of material or materials which are normally solid or immobile, but which after incorporating in the center may readily be converted into a mobile or liquid form.

Other objects will appear from the detailed description and drawing, in which latter:

Figure 1:
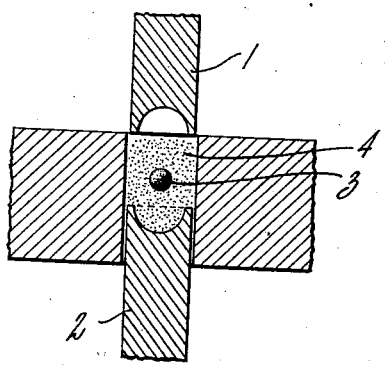
Figure 1 is a diagrammatic sectional view of an apparatus illustrating an initial step of the method.
Figure 2:
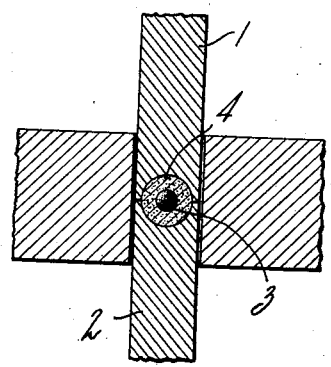
Figure 2 is a similar sectional view showing a second step.
Figure 3:
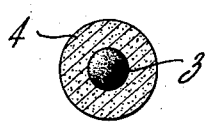
Figure 3 is a sectional view of a completed pill of filling material.
Figure 4:
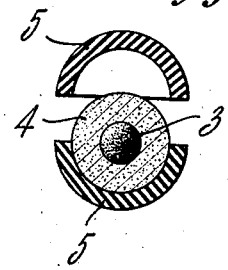
Figure 4 is a sectional view illustrating the step of placing a rubber-like envelope around the pill.
Figure 5:
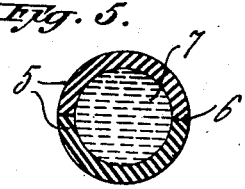
Figure 5 is a sectional view showing a complete center with a liquid or mobile filling.

One form of the method will now be described in connection with the description of a suitable apparatus for carrying out the method, there being shown in Figure 1, in section, a plunger mold having the movable elements 1 and 2. A globule 3 of solid alkali hydroxide, such as sodium hydroxide, is formed and placed in the mold by bedding it approximately centrally in a charge 4 of powdered hydrous silica. The mold is then closed as shown in Figure 2 to compress the hydrous silica in solid form around the globule of sodium hydroxide, the completed filling when removed appearing in section as shown in Figure 3. This pill of filling is then enclosed in two hemispherical halves 5 of an outer envelope which may be made of rubber. These halves may be made of a rubber compound which has been given a slight set cure, and the two halves are then further cured and united around the central pill by heat and pressure in a mold with or without the aid of cement for uniting the halves. For example, the rubber stock may be so compounded that the desired degree of final vulcanization in the mold can be accomplished in about 10 minutes at 210° F.

The powdered hydrous silica may be made by removing water from silica gel until it has an approximate content of 25% silica and 75% water. Hydrous silica of such a composition is substantially dry to the touch, but has not yet reached a hard, glassy state, and it may readily be ground to form a fairly free flowing powder. This material may be molded as such around the globule of alkali hydroxide, but the molded pill is somewhat brittle, and it is therefore preferred to add a binding material to the hydrous silica, such as titanium dioxide, zinc oxide, or glue.

After molding, the alkali hydroxide will begin to withdraw water from the hydrous silica at ordinary temperatures, and then react with the silica to form sodium silicate, and therefore, the pill must be covered at once, if prepared as above described. However, in order to enable storage of the pills until used, they may be kept at a low temperature, approximately the freezing point of water, which will retard action by the alkali hydroxide. As an alternative, the globule of sodium hydroxide may be given a thin coating of paraffin wax or other suitable material, which will also preserve the completed molded pill from any reaction between its ingredients until desired. Upon molding the hemispherical halves of the rubber or other envelope around the completed pill, the heat of the molding and curing operation will cause the action of the alkali hydroxide to begin, or in the case where the central globule is coated with paraffin wax it will soften the latter sufficiently for the reaction to begin. Upon withdrawal of water from the hydrous silica the alkali hydroxide becomes liquefied and reacts with the silica to produce an alkali silicate and water. The quantity of water present in the hydrous silica is sufficient to liquefy or mobilize the entire contents of the rubber envelope.

It is not essential that the rubber hemi-spheres be set vulcanized, as they may be merely molded under heat from unvulcanizable stock and used in an unvulcanized condition. Also, instead of giving the rubber hemi-spheres only a set cure during their molding they may be vulcanized to the desired finished state and the two-hemispheres then united around the central pill of filling material by means of a rubber cement, such as a cold curing one. Also, in place of rubber there may be used any suitable synthetic or substitute rubber or other material having suitable properties, such as the trade material known as "Neoprene", which is a polymer of chloro-2-butadiene 1,3. The covering may also be applied by a dipping operation.

If the pill of filling ingredients is surrounded by an envelope of previously cured rubber, as just described, it is obvious that the center may be used at once for applying a tense winding of rubber thread, thus avoiding all freezing steps of the prior art. In such case, where no heat whatever is used in applying the rubber envelope, the form of central globule of alkali hydroxide which is coated with paraffin wax can not be employed, unless heat is later applied to the wound center to soften the wax and start the reaction between the filling ingredients. However, where there is used the globule which does not embody the coating of paraffin wax, it will almost immediately start to liquefy at ordinary temperatures as before pointed out, and therefore, the covered center can be wound and merely allowed to stand for a short time in order to permit the alkali hydroxide to react with the silica and liquify the contents of the center.

If desired, any suitable filling ingredients may be added to the hydrous silica powder in order to adjust the specific gravity of the center of the desired specifications for the finished ball, or for other purposes. Such ingredients may include clay, lithopone, etc. Also, either sodium or potassium hydroxide may be used for reaction with the silica.

As examples of compositions of liquefiable center fillings, the following are given, the proportions however being merely illustrative:

EXAMPLE #1.—*Titanium dioxide, silica gel, and NaOH*

|  | Dry | Wet |
|---|---|---|
| Silica gel: |  |  |
| $SiO_2$ | 21.3 | 21.3 |
| $Na_2O$ | 0.8 | 0.8 |
| $Na_2SO_4$ | 4.9 | 4.9 |
| $H_2O$ |  | 73.0 |
| Titanium dioxide | 27.0 | 100.0 |
| NaOH (solid pellet) | 75.0 | 75.0 |
|  | 9.6 | 9.6 |

The first four ingredients show an analysis of the silica gel used, and the powdered silica gel is mixed with the titanium dioxide by stirring or passing through a screen. This mixture is then placed around the solid pellet of sodium hydroxide and molded in the manner previously described.

EXAMPLE #2

This example is identical with Example #1 except that 75 parts of zinc oxide are used in place of the 75 parts of titanium dioxide.

EXAMPLE #3.—*Silica gel, glue, and NaOH*

|  | Dry | Wet |
|---|---|---|
| Silica gel: |  |  |
| $SiO_2$ | 21.3 | 21.3 |
| $Na_2O$ | 0.8 | 8.0 |
| $Na_2SO_4$ | 4.9 | 4.9 |
| $H_2O$ |  | 73.0 |
| Glue (powdered) | 27.0 | 100.0 |
| NaOH (solid pellet) | 20.0 | 20.0 |
|  | 9.6 | 9.6 |

It is not essential to the invention that the filling material for the center be composed of hydrous silica and an alkali hydroxide, as any other suitable solid materials which are not injurious to rubber and not dangerous to handle may be used. All that is required is that a material or materials be employed embodying water or other liquid or the elements thereof in sufficient amount to ultimately liquefy or render mobile the filling of the center when the liquid is liberated, or that the materials, interact to produce a mobile or liquid resultant.

EXAMPLE #4

As the filling material there may be employed an equivalent of sodium sulfate (decahydrate) and an equivalent of calcium nitrate (tetrahydrate), which materials will lose water and react when heated to produce an equivalent of calcium sulfate in precipitated form, 2 equivalents of sodium nitrate and 14 of water.

EXAMPLE #5

A further combination is an equivalent of barium chloride (dihydrate) and an equivalent of sodium carbonate (decahydrate), which materials will react under heat to produce an equivalent of barium carbonate in precipitated form, 2 equivalents of sodium chloride and 12 of water.

EXAMPLE #6

A still further combination is an equivalent of disodium phosphate (dodecahydrate) and an equivalent of barium chloride (dihydrate), which ingredients will react under heat to produce an equivalent of barium diphosphate in precipitated form, 2 equivalents of sodium chloride and 14 of water.

EXAMPLE #7

Still another combination is an equivalent of sodium sulfate (decahydrate) and an equivalent of barium nitrate, which ingredients will react under heat to produce an equivalent of barium sulfate in precipitated form, 2 equivalents of sodium nitrate and 10 of water.

It is also pointed out that a large variety of liquids, such as alcohols and acids such as acetic, will associate with salts. For example, calcium nitrate may contain ethyl alcohol of crystallization. Therefore, the invention is not limited to water for obtaining liquefaction or mobilization in the finished center.

In all forms of the invention the filling material of the center ultimately becomes a liquid or mobile body containing matter in solution or suspension or both.

It will be seen that by the invention a center for golf balls or similar game balls has been provided which at the time of manufacture contains a filling of materials which are solid at ordinary temperatures, but which under determinate time and temperature conditions may be reduced to a liquid or mobile condition, which is retained at ordinary temperatures. Therefore, by the present method the centers may be made and at least a partial liquefaction of the filling material produced during the molding and/or vulcanization of a rubber or similar envelope around the solid filling material. The liquefaction will then continue at ordinary temperatures until the entire filling of the center has been reduced to a mobile condition. If such centers are to be wound after the filling has become partly or wholly liquid, it is of course necessary or at least desirable to freeze them before initiating the winding operation. However, it will be seen that by the invention the preliminary freezing of the material during the making of the center has been entirely avoided. On the other hand, if a rubber envelope of the state of vulcanization desired in the finished article is initially used for covering the solid filling material, it is possible to directly machine wind the thread on such a center, thus avoiding any of the prior art freezing steps. In such case, the filling material in the center upon standing for a short time at ordinary temperatures will liquefy without elevation of temperature, but as before pointed out, in such case a central globule of alkali hydroxide which is not covered with water impermeable material should be used.

It is obvious that numerous modifications may be made in the method and in the materials used, and it is not desired to limit the invention otherwise than as set forth in the appended claims.

Having thus described my invention, what I claim and desire to protect by Letters Patent is:

1. The method of making a ball center which comprises, molding to shape a pill from a partially dehydrated substantially dry to the touch granulated silica gel and an alkali hydroxide, enclosing the pill in an envelope of rubber-like material, and subjecting the assembly to time and temperature conditions sufficient to reduce the pill to a mobile body including alkali silicate and water.

2. The method of making a ball center which comprises, molding partially dehydrated substantially dry to the touch granulated silica gel around a solid center of alkali hydroxide to form a pill, enclosing the pill in an envelope of rubber-like material, and subjecting the assembly to time and temperature conditions sufficient to reduce the pill to a mobile body including alkali silicate and water.

3. The method of making a ball center which comprises, forming a small center of solid alkali hydroxide, coating the same with water impermeable but heat liquefiable material, molding granulated hydrous but substantially dry to the touch silica gel around the coated small center to form a pill, enclosing the pill in an envelope of rubber, and curing said envelope under heat and pressure to thereby liquefy said coating and permit reaction of said silica gel and alkali hydroxide to form a mobile body.

4. The method of making a ball center which comprises, forming a sphere containing a quantity of a partially dehydrated substantially dry to the touch granulated silica gel and a separate quantity of an alkali hydroxide, and inclosing the sphere in an envelope of resilient material, to thereby provide a ball center having an inclosed sphere which when subjected to proper time and temperature conditions will form a mobile body including alkali silicate and water.

EARDLEY HAZELL.